United States Patent Office 3,466,315
Patented Sept. 9, 1969

3,466,315
PROCESS FOR CONVERSION OF D-AZLACTONES TO DL-α-ACYLAMINO-α-METHYL-β-(3,4 - DISUBSTITUTED PHENYL) PROPIONITRILES
Raymond A. Firestone, Fanwood, and Donald F. Reinhold and Meyer Sletzinger, North Plainfield, N.J., assignors to Merck & Co., Inc., Rahway, N.J., a corporation of New Jersey
No Drawing. Continuation-in-part of application Ser. No. 406,922, Oct. 27, 1964. This application Dec. 29, 1966, Ser. No. 605,613
Int. Cl. C07c *121/50;* C07d *85/44*
U.S. Cl. 260—465         9 Claims

ABSTRACT OF THE DISCLOSURE

A process for converting an azlactone derived from D-α-methyl-(3,4-disubstituted phenyl)alanine to a DL-α-acylamino - α - methyl - β - (3,4 - disubstituted phenyl) propionitrile by reacting the D-azlactone with ammonia to form the corresponding propionamide, dehydrating the propionamide to the nitrile and racemizing the nitrile to the desired products.

---

The present application is a continuation-in-part of U.S. application Ser. No. 406,922 filed Oct. 27, 1964, now abandoned.

This invention relates to an intermediate process employed in the conversion of the D-isomer of α-methyl-dihydroxyphenylalanine to the L-isomer of α-methyldihydroxyphenylalanine. More specifically, it relates to a process of converting an azlactone derived from D-α-methyl - (3,4 - disubstituted phenyl)alanine to a DL - α-acylamino - α - methyl - β - (3,4 - disubstituted phenyl) propionitrile. Still more specifically, it relates to a process of reacting the D-azlactone of α-methyl-(3,4-dihydroxyphenyl)alanine with ammonia to produce the corresponding α-acylamino-α-methyl-β-(3,4 - disubstituted phenyl)propionamide, followed by dehydration of the amide to the corresponding D-nitrile and racemization of the D-nitrile to the corresponding DL-nitrile.

The importance of L-α-methyl-(3,4-dihydroxyphenyl) alanine as an antihypertensive agent is well known since it is extensively used in the treatment of patients suffering from hypertension resulting from a variety of different causes. It is essential in preparing the compound for use in the treatment of human patients that the L-isomer of α-methyl-(3,4-dihydroxyphenyl)alanine be substantially free of the corresponding D-isomer since the D-isomer is devoid of antihypertensive activity but has a degree of toxicity not possessed by the L-isomer.

Exemplary of the manner in which L-hydroxyphenyl-alanines are presently produced, is the preparation of α-methyldihydroxyphenlalanine, commonly known as α-methyl DOPA. The synthesis of this compound usually proceeds from methyl vanillyl or veratryl ketone in one of two ways. Either the ketone is reacted with ammonium carbonate and a cyanide salt to form a hydantoin, which upon hydrolysis delivers the corresponding α-methyl-3-methoxy-4-hydroxy (or 3,4-dimethoxy)phenylalanine, or the ketone is reacted with ammonium cyanide to form an α-amino-α-vanillyl (or veratryl) propionitrile, which can be hydrolyzed step-wise to the corresponding amide and then simultaneously demethylated and hydrolyzed to form the dihydroxyphenylalanine. These prior methods generally resolve the optical isomers at the end of the synthesis. Such prior procedures result in an accumulation of unusable D - α - methyl - dihydroxyphenylalanine which cannot be readily racemized. Many efforts have been made to find ways in which the D-form may be regenerated or racemized into the L-form so as to permit it to be used. These methods have generally required a degradation of the D-isomer to an intermediate in order that it might be re-cycled into the synthesis, since no practical way of racemizing D - α - methyl - 3,4 - dihydroxyphenylalanine was known. Recently, one method of synthesizing the L-form has been developed which provides for the resolution into the optical isomers at the aminonitrile stage by forming the N-acyl derivative. Although this method permitted the re-cycling of the D-form, this re-cycling had to be done by regeneration of the starting ketone through a degradation step and re-synthesis of the N-acyl aminonitrile compound. The degradation to the ketone, however, resulted in low yields and provided an uneconomical over-all process. Thus, it is therefore of great interest to devise a commercially economical method for the conversion of the D-isomer of α-methyl-dihydroxyphenylalanine to a racemized intermediate which can then be readily converted to L-α-methyl-3,4-dihydroxyphenylalanine.

In accordance with the present invention, a method has now been discovered for converting an easily prepared D-azlactone derivative of a D-α-methyl disubstituted phenylalanine; particularly, D - α - methyldihydroxyphenyl-alanine into the racemized DL-α-acylamino-α-methyl-β-(3,4 - disubstituted phenyl)propionitrile or, preferably, DL - α - acetamido - α - methyl - β - (3,4 - dihydroxy-phenyl)propionitrile. The method of our invention provides an economical, simple and commercially feasible process for converting an azlactone of the D-isomer of α - methyl - disubstituted phenylalanine to a racemized α-acylamino propionitrile compound without utilizing expensive reagents and intermediates and without the usual losses due to poor yields and separation techniques. Further, the process of our invention results in excellent yields at each particular stage and can be carried out with a minimum of reaction, isolation and purification steps. Also, our invention utilizes simple and economical processing equipment and technology.

It is already known that D-α-methyl-(3,4-dihydroxy-phenyl)alanine or the corresponding dimethoxy compound can be converted into an azlactone by reaction with pyridine and a lower alkanoic acid anhydride, such as acetic anhydride. In this manner, D-α-methyl-β-(3,4-dihydroxy or dimethoxyphenyl)alanine is converted to D-2,4 - dimethyl - 4 - (3',4' - dialkanoyloxy or 3',4' - dimethoxy-benzyl)azlactone in excellent yield. A detailed description of the preparation of the azlactone compounds which are the starting materials of this invention is shown in the examples.

We have now found that by reaction of the above-mentioned D-azlactones with ammonia, there is produced the corresponding D - α - acylamino - α - methyl - β-(3,4 - dialkanoyloxy or dialkoxy)propionamide, which compound is readily dehydrated to the desired D-α-acyl-amino - α - methyl - β - (3,4 - disubstituted phenyl)pro-pionitrile and the D-propionitrile compound then converted to the racemized propionitrile, generally after any of the alkanoyloxy groups on the benzene portion of the propionitrile compound have been converted to hydroxy groups. The resulting DL-α-methyl-α-acylamino-β-(3,4-disubstituted)propionitrile compound may then be easily converted to L - α - methyl - (3,4 - dihydroxyphenyl)alanine by a number of known processes, one such process being exemplified by steps 6 and 7 below.

In this manner, the over-all process allows utilization of the accumulated unwanted D-isomer and its conversion to the desired L-isomer by the following sequence of steps:

(1) Conversion of the D-α-methyl-(3,4-dihydroxyphenyl)alanine to the corresponding D-azlactone;

(2) Ammonolysis of the D-azlactone to the corresponding D-propionamide;

(3) Dehydration of the said propionamide to the corresponding D-α-acylamino propionitrile;

(4) Conversion of any alkanoyloxy groups on the benzenoid nucleus to hydroxy groups;

(5) Racemization of the resulting D-propionitrile to the corresponding DL-nitrile;

(6) Hydrolysis of the DL-α-acylamino propionitrile to the DL-α-methyl-(3,4-dihydroxyphenyl)-alanine; and (7) Resolution of the racemic DL-α-methyl-(3,4-dihydroxyphenyl)alanine by direct crystallization.

The starting materials utilized in the process of our invention are compounds having the formula:

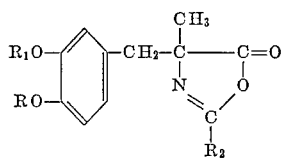

FORMULA I wherein the R and $R_1$ substituents are hydrogen, lower alkyl or lower alkanoyl substituents or, when taken together as a single substituent, are methylene; and $R_2$ is a lower alkyl substituent. These starting materials are prepared from D-α-methyl-β-(3,4-dihydroxyphenyl)alanine, as well as from the corresponding compounds wherein one or more of the hydroxy substituents may be replaced by a lower alkoxy or a lower alkanoyloxy substituent. In preparing the starting materials, the α-methyl-(3,4-disubstituted phenyl)alanine compound is reacted with a lower alkanoic acid anhydride such as acetic anhydride, butyric anhydride, pentanoic anhydride, and the like, in an acid-binding agent such as pyridine, for a short period of time. In the course of this reaction, concurrently with the formation of the azlactone ring, the lower alkanoic anhydride acylates any free phenolic hydroxyl substituents. Thus, for example, when D-α-methyl-(3,4-dihydroxyphenyl)alanine, D - α - methyl-(3,4 - dimethoxyphenyl) alanine and D-α-methyl-(3-methoxy - 4 - hydroxyphenyl) alanine are treated in pyridine solution with an excess of acetic anhydride there are produced, respectively, D-2,4-dimethyl-4-(3',4' - diacetoxybenzyl)azlactone, D-2,4-dimethyl-4-(3',4'-dimethoxybenzyl)azlactone and D-2,4-dimethyl-4-(3'-methoxy - 4' - acetoxybenzyl)azlactone. A detailed description of the preparation of the azlactone derivative is shown in Example 1.

In accordance with our invention, the D-azlactone starting materials are contacted in solution with ammonia to form a D-α-methyl-α-acylamino - β-(3,4 - disubstitutedphenyl)-propionamide, and the resulting D-propionamide is then treated with a dehydrating agent to form an α-methyl-α-acylamino-β-(3,4-disubstituted phenyl) propionitrile. It has further been found that the propionitriles resulting from the dehydration step are converted by treatment with a small amount of a base to the corresponding DL racemate of the compound. However, it has been found that if the propionitriles resulting from the dehydration step have one or more of the phenolic hydroxyls esterified, the esterified hydroxyl groups can be converted to hydroxyl groups before the compound is racemized.

In accordance with the first step of the novel process, an azlactone starting material having the formula shown above (Formula I) is contacted in solution with ammonia to form D-α-methyl-α-acylamino-β-(3,4-disubstituted phenyl)propionamide. The reaction with ammonia occurs readily at temperatures from about —50° C. to 100° C. or higher to produce the desired α-acylaminopropionamide in practically quantitative yields. For practical purposes, the reaction is preferably carried out in a solvent. The solvent may be an inert, organic solvent, mixtures of two or more such solvents or, alternatively, the solvent may be ammonia, which is one of the reactants. Thus, by merely dissolving the selected azlactone in liquid ammonia, the reaction proceeds readily with the formation of the α-methyl-α-acylaminopropionamide compound. As indicated, the solvent for the reaction is not critical and may be selected from tertiary amines such as pyridine and triethylamine; ethers such as ethyl ether, diisopropyl ether, tetrahydrofuran and dioxane; aromatic hydrocarbons such as benzene, toluene, xylene and the like; aliphatic hydrocarbons, the hexanes through the octanes being preferred; halogenated hydrocarbons such as chloroform, dichloroethane and the like, as well as lower, inert aliphatic alcohols such as isopropanol and lower aliphatic ketones such as acetone, diethyl ketone and diisobutyl ketone. The reaction is readily effected by contacting in solution the starting D-azlactone in a molar ratio of 1 mole of azlactone to at least 1 mole of ammonia. The azlactone may be added to an ammoniacal solution or to liquid ammonia and, inversely, a solution of the azlactone in one of the solvents may be contacted with ammonia by bubbling gaseous ammonia through the solution containing the dissolved azlactone. Where the starting material is a D-2,4-dimethyl-4-(3',4'-diloweralkoxy-benzyl)azlactone such as a 3,4-dimethoxy, a 3,4-diethoxy or a 3,4-dipropoxy benzyl azlactone, the products resulting from the reaction with ammonia are, respectively, D-α-acetamido-α-methyl-β-(3,4 - dimethoxyphenyl)propionamide, D-α-acetamido - α - methyl - β-(3,4-diethoxyphenyl)propionamide and D-α-acetamido-α-methyl-β-(3,4-dipropoxyphenyl)propionamide. When the starting material contains one or more phenolic ester groupings, there occurs, along with the reaction of the azlactone, a partial hydrolysis of the phenolic ester. Thus, reaction of D-2,4-dimethyl-4-(3',4'-dialkanoyloxybenzyl)azlactone such as D-2,4-dimethyl-4-(3',4'-diacetoxybenzyl)azlactone, produces a partially hydrolyzed reaction product after reaction with ammonia, D-α-acetamido-α-methyl-β-(3,4 - disubstitutedphenyl)-propionamide, wherein the phenolic ester substituents have been hydrolyzed, thus producing a mixture comprising D-α-acetamido-α-methyl-β-(3,4 - dihydroxyphenyl)propionamide, the corresponding 3,4-diacetoxyphenyl and the monoacetoxy-monohydroxy phenyl propionamide compounds or mixtures of the above.

In the conversion of the D-α-acylamino-α-methyl-β-(3,4-disubstituted)propionamide to the corresponding nitrile, the starting material is treated in solution with a dehydrating agent. Suitable dehydrating agents which may be employed in the conversion of the amide to the nitrile are phosphorus pentoxide, phosphorus pentachloride, phosphorus oxychloride and the lower alkanoic acid anhydrides, the latter being preferred. In carrying out the dehydration reaction, the selected propionamide compound is contacted in solution under substantially anhydrous conditions in an inert solvent with an excess of a dehydrating agent and heated for a brief period of time. Neither the time nor temperature of heating is critical. However, the reaction proceeds at a greater rate when the temperature of the reaction is about 50–150° C. for approximately one hour. In a preferred embodiment of this amide dehydration reaction, a selected α-acylamino-α-methyl-β-disubstituted phenyl propionamide is contacted in solution in pyridine with an excess of a lower alkanoic anhydride such as acetic anhydride, and the solution is heated to approximately 100° C. for about 1½ hours.

When the dehydrating agent employed is a lower alkanoic anhydride, there occurs concurrently with the dehydration of the amide, acylation of any phenolic hydroxyls to the corresponding phenolic esters. Thus, by reaction of D-α-acetamido-α-methyl-β-(3,4 - dihydroxyphenyl)propionamide or D-α-acetamido-α-methyl-β-(3-acetoxy - 4 - hydroxyphenyl)propionamide or D-α-acetamido-α-methyl-β-(3-hydroxy - 4 - acetoxyphenyl)propionamide with an excess of acetic anhydride in pyridine, the corresponding D-α-acetamido-α-methyl-β-(3,4-diacetoxyphenyl)propionitrile is formed in good yield.

If desired, the nitrile, after formation, is readily recovered by extraction with a lower molecular weight organic solvent which is immiscible with water. The extracted product is then isolated by removal of the solvent by distillation in vacuo to give the product as a solid residue in a substantially pure form. At this time, the resulting nitrile compound can be racemized directly, as explained in detail below. However, at this point, any ester linkages formed in the course of the acylation reaction can be hydrolyzed to the corresponding hydroxy substituted compounds.

The deacylation of the phenolic hydroxyl groups is performed by utilizing a mild hydrolysis. It has been found that the acylated hydroxyl groups will easily deacylate upon contact with a base. One can use for this purpose any desired base such as sodium hydroxide, potassium hydroxide, ammonium hydroxide, sodium bicarbonate; quaternary ammonium hydroxides; aqueous solutions of heterocyclic amines such as pyridine and even carboxylic alkali metals. Generally an aqueous solution or a lower alkanol solution such as a methanol solution of the base is used. Preferably, the hydrolysis is accomplished by refluxing the alkanoyloxy substituted nitrile for a brief period of time with a methanolic solution of sodium bicarbonate. The hydrolysis of any ester linkages before the racemization step, however, is not absolutely necessary since the racemization reaction will nevertheless proceed. The ester groups can then be hydrolyzed at some point after the racemization step itself, depending on what method is eventually used to prepare the active L-α-methyldihydroxyphenylalanine.

The racemization step of this invention is carried out by treating the D-α-acylamino-α-methyl-β-(3,4-disubstitutedphenyl)propionitrile with a base capable of removing the hydrogen from an amide nitrogen. The process may be carried out in a solvent or in a melt of the material being racemized. It may be carried out at temperatures varying from ambient to quite high temperatures. The amount of racemization is a function of the combination of process variables; namley, time, temperature, concentration of acylaminonitrile, usage of catalyst, nature of catalyst and so on. Temperatures greater than 100° C. (most preferably from 140° C. up, limited only by boiling points of solvents or use of pressure) are preferred. At lower temperatures, much longer times are needed than at the preferred 190° C. temperature. The catalysts which effect the racemization in the process of this invention are bases strong enough in alkalinity under the reaction conditions to extract a proton from an amide nitrogen. Generally, they are bases whose cations are alkali or alkaline earth metal ions or quaternary ammonium ions. The anion may be hydroxyl, carbonate, cyanide, hydride, or phenoxide (e.g. when equimolar or less amounts of sodium hydride is added to D-α-nitrile compound in solution in the cold hydrogen is evolved and the sodium phenolate salt of the aminonitrile is formed, which solution on heating readily racemizes). Preferably, the anion is cyanide since the mass action of extra cyanide ion forces the equilibrium of the above equation to the left. The catalysts usable thus include the cyanides, hydroxides, hydrides and carbonates of the alkali and alkaline earth metals. For example, compounds such as sodium cyanide, sodium hydride, sodium carbonate, potassium cyanide, potassium hydride, potassium carbonate, lithium cyanide, rubidium cyanide, cesium cyanide and the like may be used. It also includes the cyanides of a quaternary ammonium compound, especially the cyanides of the very basic tetraalkyl ammonium compounds such as tetraethylammonium cyanide. Especially preferable as a catalyst, is an alkali cyanide such as sodium cyanide. The catalyst is used in amounts of at least 0.01 mole per mole of acylaminonitriles present. Preferably, usage is of the order of 0.4 to 0.6 mole (usually 0.5 are employed) per mole of nitrile.

Although a solvent is preferred, the racemization process of this invention proceeds also in a melt of the acylaminonitrile being racemized. In addition, certain solvents such as the sulfoxides dissolve the catalyst and permit much more intimate contact. They also are known to facilitate proton removal under non-stereospecific conditions. For these reasons, they are greatly preferred. The solvent must, however, be free of hydroxyls. Usable solvents thus can be defined as high-boiling non-hydroxylated solvents for the acylaminonitriles. Especially to be preferred are the diloweralkylsulfoxides such as dimethylsulfoxide, methylethylsulfoxide, diethylsulfoxide, dipropylsulfoxide, dibutylsulfoxide, tetramethylenesulfoxide and the like. However, other sulfoxides which are also liquid at the temperature of the reaction such as methylphenylsulfoxide, ditolylsulfoxide, diallylsulfoxide and the like may also be used. Where the sulfoxide is a solid at room temperature, it needs only to have a melting point sufficiently low to permit it to be liquid at the elevated temperatures used in this reaction. The D-α-acylamino nitrile is preferably used in such a concentration that there is more than one unit volume of the solvent per unit weight of the nitrile. By unit volume and unit weight is meant such relationships as milliliters to grams, where the "unit volume" is defined as the volume occupied by a unit weight of water. Preferably, the concentration of the D-α-acylamino nitrile in the solvent is about two unit volumes per unit weight of the nitrile. Other solvents such as dimethylformamide, diethyleneglycoldimethylether and the like can similarly be used.

Generally, the exclusion of air is desirable in running the racemization step of this invention. In those cases where dihydroxyphenyl or dialkanoyloxy radicals are present, it is preferable to exclude air in order to prevent decomposition of the materials being racemized due to oxidation. The exclusion of air is carried out by flushing with nitrogen and running the reaction under nitrogen.

Following are examples which illustrate the process of this invention.

EXAMPLE 1

D-2,4-dimethyl-4-(3',4'-diacetoxybenzyl)azlactone

A mixture of 50 grams of D-α-methyl-β-(3,4-dihydroxyphenyl)alanine, 300 ml. of acetic anhydride and 100 ml. of pyridine is heated together at a temperature of about 95° C. for 2½ hours. The pyridine and unreacted acetic anhydride are distilled from the reaction mixture under reduced pressure and the residual material containing the formed product is distilled at 169–173° C. at 0.6 mm. to give 59.34 grams of an oil comprising D-2,4-dimethyl-4-(3',4'-diacetoxybenzyl)azlactone.

The above procedure is repeated using propionic acid anhydride and butyric acid anhydride in place of the acetic acid anhydride. The products obtained, respectively, by this procedure are D-2-methyl-4-ethyl-2-(3',4'-dipropionyloxybenzyl)azlactone and D-2-methyl-4-propyl-2 - (3',4'-dibutyryloxybenzyl)azlactone.

The procedure of the example is repeated using as starting materials in place of the D-α-methyl-β-(3,4-dihydroxyphenyl)alanine, equal molar amounts of D-α-methyl-β-(3,4-dimethoxyphenyl)alanine and D-α-methyl - β - (3,4-methylenedioxyphenyl)alanine. The products obtained, respectively, are D-2,4-dimethyl - 4 - (3',4' - dimethoxybenzyl)azlactone and D-2,4 - dimethyl - 4 - (3',4'-methylenedioxybenzyl)azlactone.

EXAMPLE 2

Mixtures of the mono- and diacetates of D-α-acetamido-α-methyl-β-(3,4-dihydroxyphenyl)propionamide Gaseous ammonia is bubbled into a solution of 2.3 grams of D-2,4-dimethyl - 4 - (3',4' - diacetoxybenzyl) azlactone in 5 ml. of pyridine for approximately 15 minutes. The ammonia and pyridine are removed from the reaction mixture by distillation in vacuo, leaving as a residue approximately 2 grams of a mixture comprising D-α-acetamido - α - methyl - β - (3,4-dihydroxy, 3,4-diacetoxy, 3-acetoxy-4-hydroxy or 4-hydroxy-3-acetoxy) phenyl propionamide.

The above procedure is repeated using in place of D-2,4-dimethyl - 4 - (3',4' - diacetoxybenzyl)azlactone, the compounds D-2,4-dimethyl - 4 - (3',4' - dimethoxybenzyl) azlactone and D-2,4-dimethyl-4-(3',4' - methylenedioxybenzyl)azlactone. The products obtained, respectively, in accordance with this procedure, are D-α-acetamido - α - methyl-β-(3,4-dimethoxyphenyl)propionamide and D - α-acetamido-α-methyl - β - (3,4 - methyenedioxyphenyl) propionamide.

EXAMPLE 3

D-α-Acetamido-α-methyl-β-(3,4-diacetoxyphenyl) propionitrile

To 1 gram of pyridine hydrochloride is added a solution of 2 grams of the product produced in accordance with the procedure set forth in the first paragraph of Example 2, in 10 ml. of pyridine and 10 ml. of acetic anhydride. The solution is heated at a temperature of 95° C. for 90 minutes to form D-α-acetamido-α-methyl-β-(3,4-diacetoxyphenyl)propionitrile. The solvents are removed from the reaction mixture by distillation in vacuo and the residue comprising the product flushed with three 10 ml. portions of pyridine. The residual material, after removal of the pyridine by distillation, is dissolved in ethyl acetate and the solution of the product in ethyl acetate washed successively with two 5 ml. portions of 0.5 N hydrochloric acid, two 5 ml. portions of water and two 5 ml. portions of saturated aqueous sodium bicarbonate solution. The ethyl acetate solution of the product is then dried and the ethyl acetate removed by distillation in vacuo, leaving as a residue, 2.07 grams of D-α-acetamido-α-methyl - β - (3,4 - diacetoxyphenyl)propionitrile (M.P. 117° C.) in substantially pure form.

The above procedure is repeated using in place of the product produced in accordance with the procedure set forth in the first paragraph of Example 2, equimolar amounts of the compounds D-α-acetamido-α-methyl-β-(3,4-dimethoxyphenyl)propionamide and D-α-acetamido-α-methyl-β - (3,4 - methylenedioxyphenyl)propionamide. The products obtained in accordance with this procedure are D-α-acetamido-α-methyl-β-(3,4 - dimethoxyphenyl) propionitrile and D-α-acetamido - α - methyl - β - (3,4-methylenedioxyphenyl)propionitrile, respectively.

Also, starting with the product produced in the first part of Example 2 but using as dehydrating agents phosphorous pentoxide, phosphorous pentachloride or phosphorous oxychloride in place of acetic anhydride, there would be produced a mixture of D-α-acetamido-α-methyl-β-(3,4-dihydroxy, 3,4-diacetoxy, 3-acetoxy - 4 - hydroxy and 4-hydroxy-3-acetoxy)phenyl propionitrile.

EXAMPLE 4

D-α-Acetamido-α-methyl-β-(3,4-dihydroxyphenyl) propionitrile

To a solution of 2.06 grams of α-acetamido-α-methyl-β - (3,4 - diacetoxyphenyl)propionitrile in 50 ml. of methanol is added 1.09 grams of sodium bicarbonate and the solution heated to reflux temperature for a period of 5 hours. The entire reaction mixture is neutralized with dilute hydrochloric acid and concentrated to dryness, leaving the product, D-α-acetamido-α-methyl - β - (3,4-dihydroxyphenyl)propionitrile, as a residue. The residue is flushed with absolute ethanol and then extracted into absolute ethanol. The ethanol solvent is removed from the product by concentration of the mixture in vacuo, leaving an oil containing the product. Crystalline product is obtained on trituration with isopropanol. Recrystallization from hot water gives substantially pure material, M.P. 189–192° C.

EXAMPLE 5

DL-α-Acetamido-α-methyl-β-(3,4-dihydroxyphenyl) propionitrile

A mixture of .469 gram of D-α-acetamido-α-methyl-β-(3,4-dihydroxyphenyl)propionitrile and 0.049 gram of sodium cyanide in 4.0 ml. of dimethylsulfoxide is purged alternately with vacuum and nitrogen and then heated at reflux under a nitrogen blanket at 195° C. for a period of about 15 minutes. The entire reaction mixture is concentrated in vacuo to leave as a residue a brown material comprising the product. The residue is dissolved in isopropanol and chromatographed on a silica gel column using isopropanol as the eluting solvent. The major fraction of product eluted from the column is greater than 90% racemized. The residual material is crystallized from ethyl acetate to give pure DL-α-acetamido-α-methyl-β-(3,4-dihydroxyphenyl)propionitrile, M.P. 192–195° C. This material, when admixed with the starting material, melts at 182° C.

When D-α-acetamido-α-methyl - β - (3,4 - diacetoxyphenyl)propionitrile is used in place of the starting material used in the foregoing procedure, the product produced is DL-α-acetamido-α-methyl - β - (3,4 - diacetoxyphenyl)propionitrile, racemization having occurred during the treatment with sodium cyanide. The DL-α-acetamido-α-methyl-β-(3,4 - diacetoxyphenyl)propionitrile is preferably isolated as the dihydroxy analog by treating the reaction mixture of the diacetoxy compound with water or a base to effect the hydrolysis of the acetoxy groups.

Likewise, when the corresponding D-α-acetamido-α-methyl-β-(3-hydroxy-4-acetoxyphenyl)propionitrile, D-α-acetamido - α-methyl-β-(3-acetoxy-4-hydroxyphenyl)propionitrile, or mixtures of the above, are used as starting materials in the foregoing procedure, there is produced the corresponding DL-compounds, racemization having occurred during the treatment with sodium cyanide. Again, however, these resulting DL-compounds are best isolated as the dihydroxy analogs by treatment of the reacion mixture with water or a base to effect the hydrolysis.

The procedure of the foregoing example is repeated, using in place of D-α-acetamido-α-methyl-β-3,4-dihydroxyphenyl)propionitrile, equal molar amounts of D-α-acetamido - α - methyl - β-(3,4-dimethoxyphenyl)propionitrile and D-α-acetamido-α-methyl-β-(3,4-methylenedioxyphenyl)propionitrile. The products obtained, respectively, are DL - α-acetamido-α-methyl-β-(3,4-dimethoxyphenyl)propionitrile and DL-α-acetamido-α-methyl-β-(3,4-methylenedioxyphenyl)propionitrile.

The procedures above are repeated using in place of sodium cyanide an equimolar amount of sodium hydride, sodium carbonate, potassium cyanide, potassium hydride, potassium carbonate or lithium cyanide. There will be produced the corresponding DL compound in each case. Similarly the above bases can be employed in solvents such as diethylsulfoxide, methylenesulfoxide, or dipropyl sulfoxide in place of dimethylsulfoxide with the corresponding DL compounds being produced.

What is claimed is:

1. A process which comprises reacting one molar proportion of a D-azlactone compound of the formula

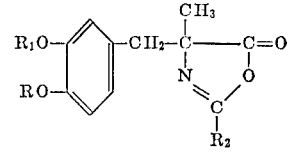

wherein R and $R_1$ are lower alkyl, lower alkanoyl, hydrogen or, when taken together as a single substitutent, methylene; and $R_2$ is lower alkyl with at least one molar proportion of ammonia at a temperature above about −50° C. to form the corresponding D-propionamide compound of the formula

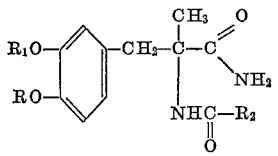

wherein R, R₁ and R₂ are as defined above, contacting said propionamide compound in an inert solvent with an excess of a dehydrating agent under substantially anhydrous conditions to form a D-propionitrile having the formula

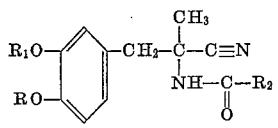

wherein R, R₁ and R₂ are as defined above, and contacting said propionitrile compound with at least 0.01 mole of a base per mole of said propionitrile to effect racemization of said nitrile.

2. The process of claim 1 wherein the dehydrating agent is acetic anhydride and the base is sodium cyanide.

3. A process which comprises reacting one molar proportion of a D-azlactone compound of the formula

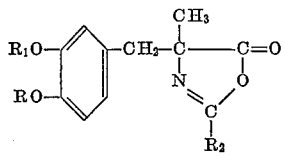

wherein R and R₁ are lower alkyl, lower alkanoyl, hydrogen or, when taken together as a single substituent, methylene; and R₂ is lower alkyl with at least one molar proportion of ammonia at a temperature above about −50° C. to form the corresponding D-propionamide compound of the formula

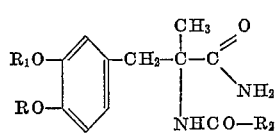

wherein R, R₁ and R₂ are as defined above, contacting said propionamide compound in an inert solvent with an excess of a dehydrating agent under substantially anhydrous conditions to form a D-propionitrile having the formula

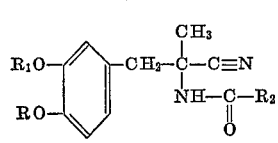

wherein R, R₁ and R₂ are as defined above, hydrolyzing with a base any lower alkanoyloxy group on the benzenoid portion of the nitrile compound to hydroxy groups and contacting said propionitrile compound with at least 0.01 mole of a base per mole of said propionitrile compound to effect racemization of said nitrile compound.

4. The process of claim 3 wherein the dehydrating agent is acetic anhydride, the hydrolysis of any lower alkanoyl group is accomplished by reacting the nitrile compound having the alkanoyloxy groups thereon with a methanolic solution of sodium bicarbonate, and wherein the base is sodium cyanide.

5. A process which comprises reacting one molar proportion of D-2,4-dimethyl-4-(3′,4′-dimethoxybenzyl)azlactone with at least one molar proportion of ammonia at a temperature above about −50° C. to form D-α-methyl-α-acetamido-β-(3,4-dimethoxyphenyl)propionamide, contacting said propionamide in an inert solvent with an excess of a dehydrating agent under substantially anhydrous conditions to form D-α-methyl-α-acetamido-β-(3,4-dimethoxyphenyl)propionitrile, and contacting said D-propionitrile compound with at least 0.01 mole of a base per mole of said propionitrile to effect racemization of said nitrile.

6. The process of claim 5 wherein the dehydrating agent is acetic anhydride and the base is sodium cyanide.

7. The process which comprises reacting one molar proportion of D-2,4-dimethyl-4-(3′,4′-diacetoxybenzyl)azlactone with at least one molar proportion of ammonia at a temperature above about −50° C. to form one or more compounds selected from the group consisting of D-α-methyl-α-acetamido-β-(3-acetoxy-4-hydroxyphenyl)propionamide, α-methyl-α-acetamido-β-(3-hydroxy-4-acetoxyphenyl)propionamide, and D-α-methyl-α-acetamido-β-(3,4-diacetoxyphenyl)propionamide, and D-α-methyl-α acetamido-β-(3,4-dihydroxyphenyl)propionamide, contacting said mixture of D-propionamides in an inert solvent with an excess of an acetic anhydride under substantially anhydrous conditions to form D-α-methyl-α-acetamido-β-3,4-diacetoxyphenyl)propionitrile, and contacting said propionitrile with at least 0.01 mole of a base per mole of said propionitrile to produce DL-α-methyl-α-acetamido-β-(3,4-diacetoxyphenyl)propionitrile.

8. The process which comprises reacting one molar proportion of D-2,4-dimethyl-4-(3′,4′-diacetoxybenzyl)azlactone with at least one molar proportion of ammonia at a temperature above about −50° C. to from one or more compounds selected from the group consisting of D-α-methyl-α-acetamido-β-(3-acetoxy-4-hydroxyphenyl)-propionamide, D-α-methyl-α-acetamido-β-(3-hydroxy-4-acetoxyphenyl)propionamide, D-α-methyl-α-acetamido-β-(3,4-diacetoxyphenyl)propionamide and D-α-methyl-α-acetamido-β-(3,4-dihydroxyphenyl)propionamide, contacting said mixture of D-propionamides in an inert solvent with an excess of an acetic anhydride under substantially anhydrous conditions to form D-α-methyl-α-acetamido-β-(3,4-diacetoxyphenyl)propionitrile, hydrolyzing with a base the diacetoxy groups to dihydroxy groups and contacting the D-α-methyl-α-acetamido-β-(3,4-dihydroxyphenyl)-propionitrile with at least 0.01 mole of a base per mole of said propionitrile to produce DL-α-methyl-α-acetamido-β-(3,4-dihydroxyphenyl)propionitrile.

9. The process of claim 8 wherein the base is sodium cyanide and the hydrolysis of the diacetoxy groups to dihydroxy groups is carried out by contacting the propionitrile compound having the diacetoxy groups thereon with a methanolic solution of sodium bicarbonate.

References Cited

UNITED STATES PATENTS

| | | |
|---|---|---|
| 3,401,178 | 9/1968 | Firestone et al. |
| 3,329,711 | 7/1967 | Hegedüs et al. _____ 260—559 |
| 3,366,679 | 1/1968 | Reinhold et al. ____ 260—465 X |

FOREIGN PATENTS 638,484  4/1964  Belgium.

OTHER REFERENCES

Wagner et al., Synthetic Organic Chemistry, 1963, pp. 169, 170 and 596–598.

Corey et al., Journal American Chemical Society, vol. 81, 1959, pp. 5209–5212.

Elderfield, Heterocyclic Compounds, vol. 5, 1957, p. 361.

Weiss et al., Journal American Chemical Society, vol. 71, 1949, pp. 2650–2652.

CHARLES B. PARKER, Primary Examiner

S. T. LAWRENCE III, Assistant Examiner

U.S. Cl. X.R.

260—307, 340.5, 479, 559